United States Patent [19]

Thompson, Jr.

[11] 4,389,765
[45] Jun. 28, 1983

[54] PILING REMOVAL

[75] Inventor: Floyd M. Thompson, Jr., Spring, Tex.

[73] Assignee: Crutcher Resources Corporation, Houston, Tex.

[21] Appl. No.: 260,030

[22] Filed: May 4, 1981

[51] Int. Cl.³ .................... B23P 19/00; B23B 3/04; E21B 29/00
[52] U.S. Cl. .................... 29/426.5; 82/82; 166/55.8
[58] Field of Search .............. 83/187, 54; 82/82, 4 C, 82/2 D; 166/55.6, 55.7, 55.8; 175/263; 30/103, 105, 106, 104; 405/225, 227; 29/426.5

[56] References Cited

U.S. PATENT DOCUMENTS

| | | | |
|---|---|---|---|
| 2,915,819 | 12/1959 | O'Day | 30/103 |
| 3,052,024 | 9/1962 | Courtney | 30/105 |
| 3,332,492 | 7/1967 | Thomas | 166/55.8 |
| 3,717,056 | 2/1973 | Gracin et al. | 82/82 |
| 3,733,939 | 5/1973 | Paysinger et al. | 82/4 C |
| 3,859,877 | 1/1975 | Sherer et al. | 82/82 |
| 4,047,568 | 9/1977 | Aulenbacher | 166/55.8 |
| 4,126,065 | 11/1978 | Clavin | 82/82 |

FOREIGN PATENT DOCUMENTS 53-27182  3/1978  Japan .................... 30/104

*Primary Examiner*—Ervin M. Combs
*Assistant Examiner*—Steven E. Nichols
*Attorney, Agent, or Firm*—Richards, Harris & Medlock

[57] ABSTRACT

A unit (10) is employed such that sections of piling are separated and removed from the surrounding leg jackets to facilitate relocation of an offshore drilling platform. Unit (10) comprises a clamping section (20) by which the unit is secured in place and then utilized to lift a separated section of piling after operation of a cutting section (22). The cutting section (22) includes a rotatable plate (56), at least one cutting disk (68) mounted for movement on the plate, a cylinder (76) for actuating each cutting disk inwardly and outwardly, and a motor (62) for driving the plate.

4 Claims, 1 Drawing Figure

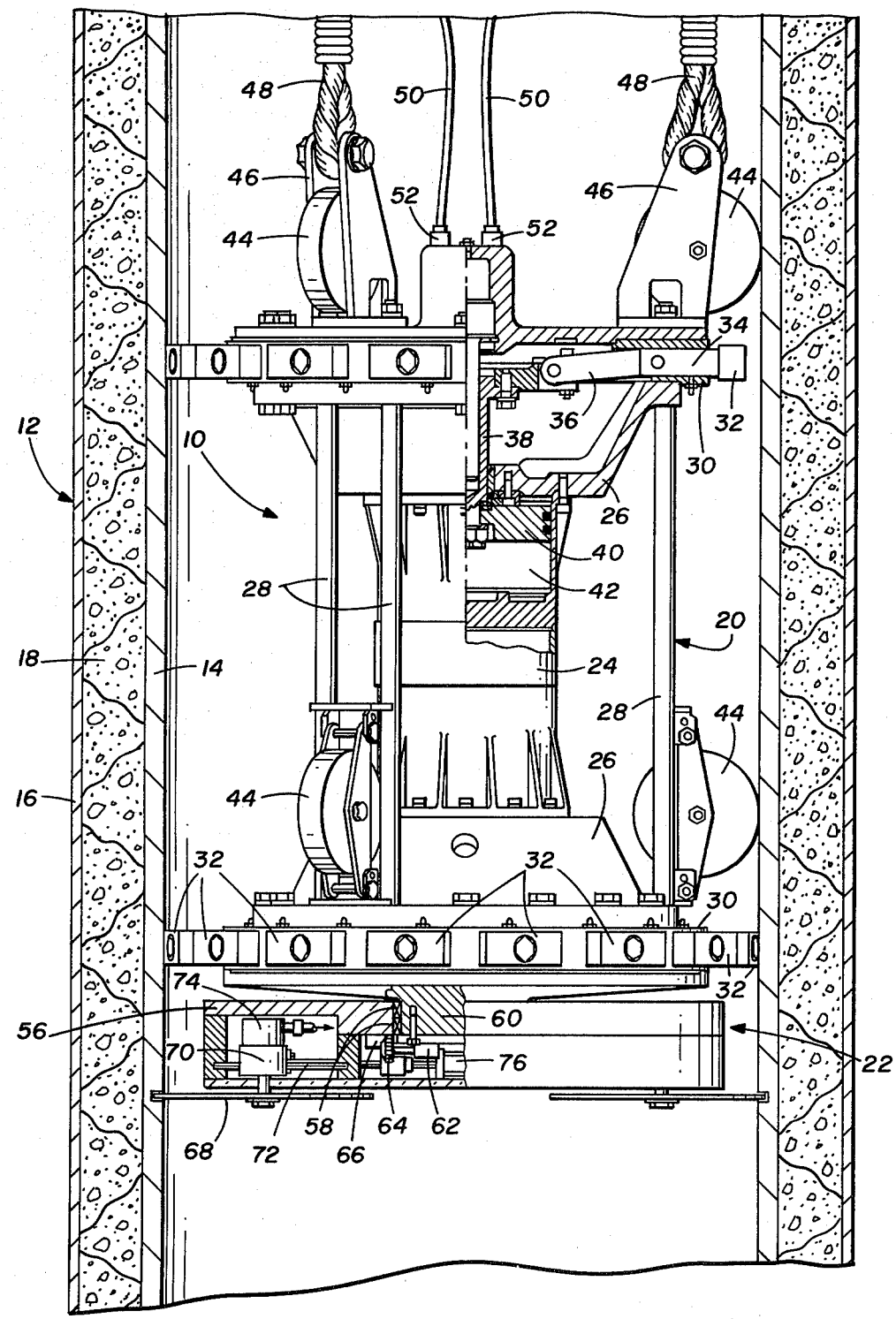

PILING REMOVAL

TECHNICAL FIELD

The present invention relates generally to removal of sections of internal pilings extending through cylindrical legs on an offshore drilling platform to facilitate relocation of the platform, and involves apparatus for forming an internal circumferential cut into an elongate tubular pile.

BACKGROUND ART

Offshore drilling platforms are typically supported on legs which extend downward to the sea floor. On many platforms tubular legs are employed wherein an external cylindrical jacket surrounds an internal piling. The piles extend through the jackets and are driven into the sea floor for stabilization of the platform at a desired site. Annular spaces between the pilings and jackets are usually filled with grout to cement the pilings in place and provide additional stiffness.

When it is desired to relocate a drilling platform, the common practice heretofore has been to sever the legs of the platform at the sea floor by means of explosives. This approach, however, damages the legs which damages are both costly and time consuming to repair but must be done before the platform can be installed at another site. Oftentimes it has been necessary first to tow the platform to shore and then position it on land for performance of the necessary repairs. It will thus be readily appreciated that this approach to platform relocation involves manifold difficulties.

More recently, efforts have been directed toward developing a technique whereby installed pilings can be removed from the legs of offshore platforms while leaving the external jackets intact. To do so, the grout must be broken to break the bond between the jacket and the pile, after which the pile is removed without damaging the surrounding jackets. In view of the extended length of such pilings, it is desirable that any such means be capable of remote releasable connection to the piling to facilitate removal.

A need thus exists for a piling removal apparatus adapted for segmenting and lifting sections of piling from the jacket legs of offshore platforms.

SUMMARY OF INVENTION

The present invention comprises piling removal apparatus. In accordance with the invention, there is provided an apparatus adapted for lowering through a piling of an offshore platform for submersible operation. The apparatus comprises a clamping section with a cutting section secured to the lower end thereof. Wheels are provided on the clamping section for guiding and facilitating movement of the apparatus through a piling. The clamping section preferably includes a pair of spaced apart circumferential sets of clamp shoes which can be selectively actuated outwardly to engage the wall of the piling. Appropriate lift lugs and hydraulic connections are provided on the upper end of the clamping section. A cutting section includes a rotatable faceplate with a cutter of which can be selectively actuated outwardly to form a circumferential cut into the piling as the faceplate is rotated. The apparatus thus permits sections of internal piling to be separated and lifted without damaging the surrounding jacket.

BRIEF DESCRIPTION OF DRAWING

A more complete understanding of the invention can be had by reference to the following Detailed Description in conjunction with the accompanying Drawing, wherein:

The FIGURE is a side view (partially cut away) of the piling removal apparatus incorporating the invention.

DETAILED DESCRIPTION

Referring now to the Drawing, there is shown a piling removal unit 10 incorporating the invention. Apparatus 10 is shown disposed inside the leg 12 of an offshore drilling platform. Although particularly adapted for this application, it will be understood that the invention can be utilized in other applications where it is desired to sever and remove sections of an internal tubular structure while leaving intact a surrounding external structure.

As illustrated, platform leg 12 comprises an internal tubular piling 14 surrounded by an external tubular jacket 16. In practice after the drilling platform (not shown) has been erected at a desired site, piling 14 is driven through jacket 16 of leg 12 and into the sea floor for stabilization. The annular space between the piling 14 and jacket 16 of each leg 12 is then filled with grout 18 to cement the pilings in place and provide additional rigidity.

If the piling 14 in each leg 12 is to be removed, the grout 18 must first be fractured or broken to release the bond between piling 14 and jacket 16. This can be accomplished by use of an ultrasonic device, expansion device or other suitable means lowered into leg 12 to fracture grout 18 before unit 10 is utilized.

Unit 10 includes a clamping section 20 and a cutting section 22. The clamping section 20 comprises a conventional expander device of the type utilized in precision forming the ends of pipe sections, but modified and adapted for use in a substantially vertical orientation under submerged conditions. It will be appreciated that the interior of piling 14 is typically filled with sea water. The expander section may be like that shown in U.S. Pat. No. 3,733,939 assigned to the assignee hereof. If can readily be modified and adapted for use as the clamping section 20 herein.

More particularly, the clamping section 20 comprises a hollow intermediate body 24 connected between a pair of drum-shaped hollow head members 26. A series of axial connecting bars 28 are secured between the head members 26 for reinforcement. Ring members 30 are secured to the outside of head members 26 at opposite ends of clamping section 20.

A plurality of circumferentially spaced movable clamp shoes 32 are mounted on each ring member 30. Two sets of clamp shoes 32 are thus provided, the sets being structurally and functionally identical. For clarity, a portion of body 24 and portions of one head member 26 and adjacent ring member 30 have been broken away to show typical constructional details concerning clamp shoes 32.

Each clamp shoe 32 of each set is secured to the end of a radial rod 34 by means of a bolt or other suitable fastener. The interior ends of the rods 34 of each said of clamp shoes 32 are coupled by links 36 to a spider member 38 mounted for axial movement within each head member 26. Connected to the inner end of each spider member 38 is a piston 40 mounted for axial movement within a chamber 42 such that the position of clamp shoes 32 is controlled via pneumatic or hydraulic actuation. Depending upon the side of pistons 40 on which pressurized fluid is directed into chambers 42, the spider members 38 are simultaneously actuated inwardly or outwardly causing the clamp shoes 32 to engage or disengage the interior surface of piling 14. The drawing shows clamp shoes 32 in their radial outwardly extended position in clamping engagement with piling 14.

The clamping section 20 further includes two sets of wheels 44 to guide and direct apparatus 10 when it is inserted into the upper end of a leg 12 and lowered through piling 14. The wheels 44 are preferably arranged in two axially spaced sets of three each about the periphery of the clamping section. The lower set of wheels 44 is mounted on bars 28 in spaced circumferential relationship adjacent to the lowermost ring of clamp shoes 32. The upper set of wheels 44 is rotatably supported by lugs 46 bolted to the upper end of the clamping section 20. Lugs 46 are adapted for connection to cables 48 by which apparatus 10 is lowered and lifted within the leg 12. Hydraulic or pneumatic conduits 50 are connected to fittings 52 which are also provided on the upper end of the clamping section 20 for providing controlled pressurization for clamp shoes 32 and the cutting section 22. External conduits 50 and fittings 52 are attached to a central spindle 54 such that appropriate internal connections can be made through a hollow center portion of clamping section 20 to chambers 42 and cutting section 22.

The cutting section 22 comprises a rotatable faceplate 56 supported by bearings 58 on a central spindle 60 located on the lower end of the clamping section 20. A drive motor 62, which is preferably of the hydraulic or pneumatic type, is mounted on the stationary spindle 60. Motor 62 drives a pinion gear 64 which is enmeshed with a circular rack gear 66 attached to the faceplate 56. A pair of circular saws or cutting disks 68 are mounted in diametrically opposed relationship on faceplate 56. Each cutting disk 68 is supported on a slide block 70 which in turn is mounted on a pair of rods 72. A motor 74, which is preferably of the hydraulic or pneumatic type, is mounted for movement with each block 70 and is drivingly connected to the corresponding cutting disk 68. Coupled to each slide block 70 is a double acting cylinder 76 by which the block, and corresponding cutting disk 68 and drive motor 74, can be selectively actuated outwardly. It will thus be apparent that as faceplate 56 rotates under the action of motor 62, the cutting disks 68 can be actuated outwardly by cylinders 76 to form a circumferential cut in the wall of piling 14. Appropriate stops can be provided, or the strokes of cylinders 76 can be selected, so as to limit outward movement of the cutting disks 68.

The piling removal unit 10 herein operates as follows. After the decision has been made to relocate a drilling platform and the grout 18 has been fractured to release the bond between the piling 14 and jacket 16 of leg 12, unit 10 is lowered into the piling 14 and positioned at some distance below the top end of the leg. The clamping section 20 is then actuated to secure apparatus 10 in place by the clamp shoes 32 after which the cutting section 22 is operated. As the faceplate 56 revolves under the action of the drive motor 62, the cutting disks 68 revolving under the action of drive motors 74 are forced outwardly by the cylinders to form a circumferential cut into the internal surface and through the wall of piling 14. Cutting disks 68 may also penetrate grout 18 somewhat but do not travel so far outwardly as to engage the surrounding jacket 16. The cutting disks 68 of the cutting section 22 are then retracted while the clamp shoes 32 of the clamping section 20 are maintained in extended position so that the severed section of piling 14 can then be lifted out of the surrounding jacket 16. This process continues section by section until the piling 14 from each leg 12 has been removed to a depth at or immediately below the sea floor so that the legs can be raised sufficiently to permit relocation of the platform.

From the foregoing, it will be apparent that the present invention comprises offshore platform piling removal having several advantages over the prior art. The apparatus permits removal and recovery of pilings section by section without the risk and damage associated with freeing the legs of a platform by means of explosives. Other advantages will be evident to those skilled in the art.

Although particular embodiments of the invention have been illustrated in the accompanying Drawing and described in the foregoing Detailed Description, the invention is not limited to the embodiment disclosed, but is intended to embrace such modifications as fall within the scope of the appended claims.

I claim:

1. A method of removing a piling from a surrounding leg bonded to the piling, comprising the steps of:
   breaking the bond interconnecting the piling and leg to free the piling;
   lowering a clamp/cutter into the piling to a point located a predetermined distance below the upper end of the piling;
   forming an internal circumferential cut through the piling with the cutter of the clamp/cutter to separate the piling into upper and lower portions;
   actuating the clamp portion of the clamp/cutter to engage the upper portion of the piling; and
   lifting the clamp/cutter and separated upper portion of the piling from the surrounding leg.

2. The method of claim 1, wherein the piling and leg are bonded together with grout, and wherein the step of breaking the bond therebetween comprises fracturing the grout.

3. The method of claim 1, wherein the step of actuating the cutter portion of the clamp/cutter comprises the steps of:
   providing on the lower end of the clamp/cutter a platform rotatable about the longitudinal axis of the piling;
   mounting at least one cutter on the platform for radial movement toward the piling;
   selectively rotating the platform; and
   selectively moving each cutter on the platform outward, thereby forming a circumferential cut through the piling.

4. The method of claim 1, wherein the step of actuating the clamp portion of the clamp/cutter comprises the steps of:
   providing a plurality of radially movable, circumferentially spaced clamp shoes in two axially spaced apart sets; and
   selectively actuating the clamp shoes into engagement with the piling.

* * * * *